US008381096B2

(12) United States Patent
Yerubandi et al.

(10) Patent No.: US 8,381,096 B2
(45) Date of Patent: Feb. 19, 2013

(54) MANAGING LIST TAILORING FOR A MOBILE DEVICE

(75) Inventors: Venkata Narasimha Rao Yerubandi, Sunnyvale, CA (US); Darshan Ramesh Patel, Santa Monica, CA (US); Andrey Kornev, Campbell, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1234 days.

(21) Appl. No.: 11/686,794

(22) Filed: Mar. 15, 2007

(65) Prior Publication Data

US 2008/0228906 A1 Sep. 18, 2008

(51) Int. Cl.
*G06F 17/27* (2006.01)
(52) U.S. Cl. .......................... 715/238; 715/227; 715/252
(58) Field of Classification Search .................. 715/227, 715/238, 252
See application file for complete search history.

(56) References Cited

U.S. PATENT DOCUMENTS

| 4,481,594 | A  | * | 11/1984 | Staggs et al. | 345/589 |
| 6,157,379 | A  | * | 12/2000 | Singh | 715/866 |
| 6,246,422 | B1 | * | 6/2001 | Emberling et al. | 345/552 |
| 6,336,038 | B1 | * | 1/2002 | Nojima et al. | 455/557 |
| 6,670,968 | B1 | * | 12/2003 | Schilit et al. | 715/760 |
| 6,674,453 | B1 | * | 1/2004 | Schilit et al. | 715/810 |
| 7,640,313 | B2 | * | 12/2009 | Rounthwaite et al. | 709/206 |
| 2004/0255244 | A1 | * | 12/2004 | Filner et al. | 715/517 |
| 2005/0021935 | A1 | * | 1/2005 | Schillings et al. | 713/1 |
| 2005/0177853 | A1 | * | 8/2005 | Williams et al. | 725/81 |
| 2006/0069898 | A1 | * | 3/2006 | Patel et al. | 711/171 |
| 2007/0112935 | A1 | * | 5/2007 | Espelien | 709/217 |
| 2009/0132718 | A1 | * | 5/2009 | Groll et al. | 709/229 |
| 2009/0285547 | A2 | * | 11/2009 | Ichihashi et al. | 386/83 |

OTHER PUBLICATIONS

Kim et al.; Device-independent Web Browsing Based on CC/PP and Annotation; Jun. 13, 2005; Interacting With Computers; pp. 284-285, 287, 292, 294, and 298-300.*

* cited by examiner

*Primary Examiner* — Doug Hutton, Jr.
*Assistant Examiner* — Andrew Dyer
(74) *Attorney, Agent, or Firm* — Frommer Lawrence & Haug LLP; Jamie L. Wiegand

(57) ABSTRACT

A network device, system, and method are directed towards enabling list content to be displayed at mobile devices having different memory page size constraints. When a mobile device requests list content, a type of mobile device is determined. This may then be used to determine a page size weight classification for the mobile device. The requested list content may then be compared against the page size weight classification, and if it exceeds the page size weight classification, the list content may be tailored. In one embodiment, the list content may be tailored by segmenting the list content into multiple segments, each segment may be coupled with <next> and/or <previous> links. Different list content types may employ different list splitting sizes for display. For example, display of movie lists may display a different number of items within the list content than, for example, an email list of messages, or the like.

20 Claims, 5 Drawing Sheets

MANAGING LIST TAILORING FOR A MOBILE DEVICE

TECHNICAL FIELD

The present invention relates generally to mobile communications and, more particularly, but not exclusively to enabling page tailoring of list content for a mobile device based on a page size weight comparison.

BACKGROUND

The growth of the Internet has brought a corresponding increase in the number and variety of computing devices being employed to communicate over the Internet. Today's computing devices vary from desktop computers with a large variety of features and capabilities, to mobile devices such as pagers, cellular phones, personal digital assistants (PDAs), and the like, with lesser features and/or capabilities. For example, many of these computing devices include some form of Internet browsing capability. In addition, many of the computing devices are configured to allow users access to audio files, and/or graphical files via wireless and/or wired networks.

However, access to some content may be difficult as a result of various limitations, including those of the computing devices, bandwidth, and/or other factors. For example, different mobile devices may have widely varying memory page size constraints, making reliable delivery and rendering of content extremely difficult across disparate mobile devices. While a number of techniques may exist to customize content for a particular mobile device, or other computing device, these techniques may have an unpredictable effect on the delivery size of the content. Moreover, some of these techniques may even result in lose of some of the content. When the content's memory page footprint exceeds that of the capability of the mobile device for which the content is to be delivered, the mobile device may be unable to view the content, may provide an error message, or sometimes even 'lock up.' Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
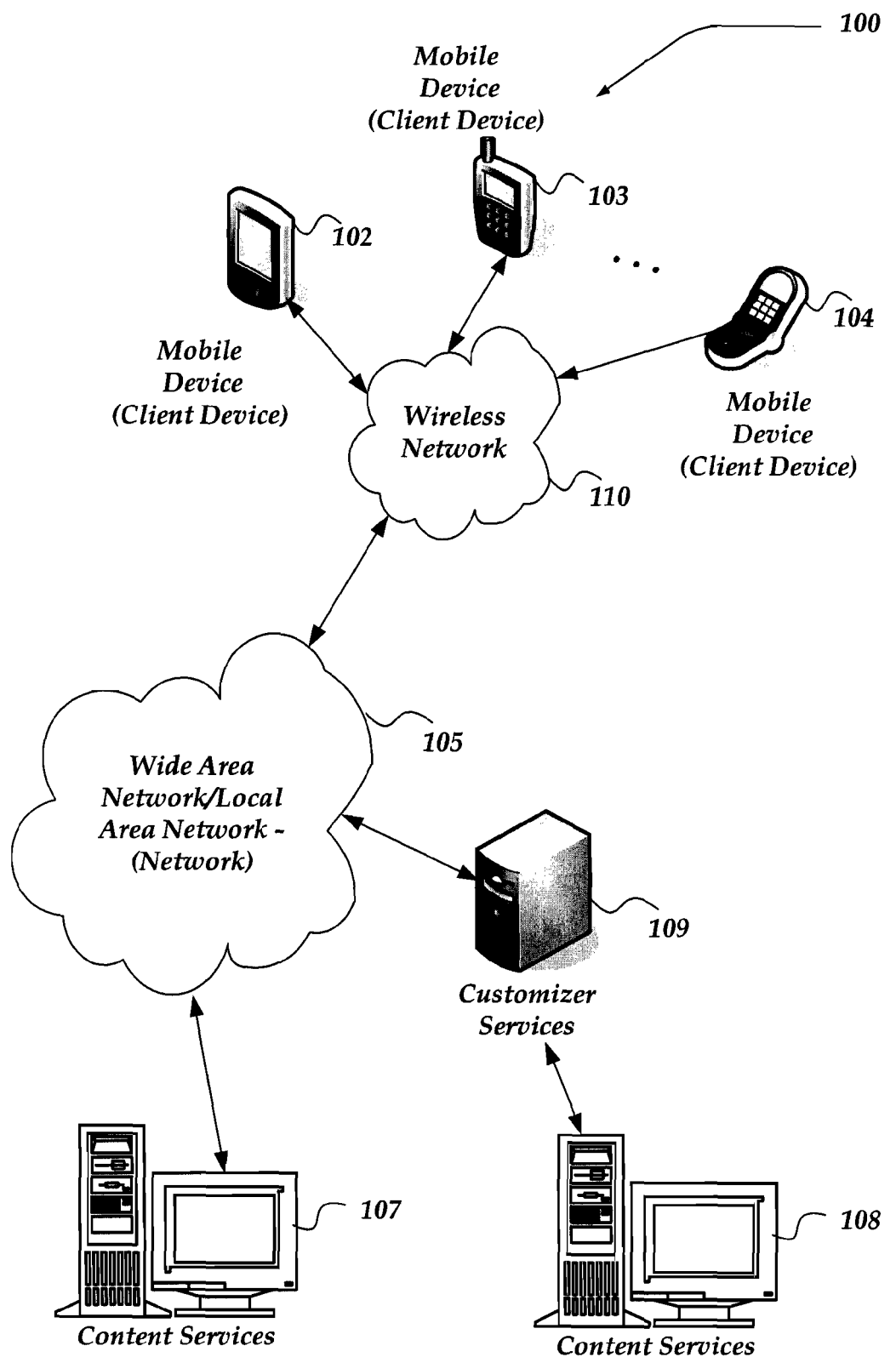
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" refers to any form of data that may be communicated over a network between network devices. Content may therefore include, but is not limited to a web page, a graphic, an audio clip, a video clip, a file, a binary file, a document, or the like. Moreover, "list content," refers to any computer displayable content that includes one or more lists for organizing the content.

Briefly stated the present invention is directed towards enabling list content to be displayed on mobile devices having different memory page size constraints. When a mobile device requests content that includes a list, a type of the requesting mobile device is determined. The list content may include one or more lists (or sub-lists). For example, the invention might manage multiple sub-lists within list content, such as might be employed for email applications, movie lists, music lists, or the like. In one embodiment, the mobile device type may be obtained through a communication with a user agent, such as a browser, an applet, script, application, or the like, residing on the mobile device. The mobile device type may then be used to determine a page size weight for the mobile device. In one embodiment, the page size weight may be used to classify the mobile device as a very small display capability, small capability, medium, large, extra large, or the like. The requested list content may then be compared against the page size weight classification. If the list content exceeds the page size weight classification, the list content may be tailored. In one embodiment, the list content may be tailored by splitting the list content into one or more segmented lists (or sub-lists), each segmented list being coupled, in one embodiment, with <next> and/or <previous> links. Thus, segmented lists within the list content that fit within the mobile device's memory page size constraints may be transferred to the mobile device for display, without lose of list content.

In one embodiment, different list content type may employ different list splitting sizes for display. For example, in one embodiment, display of movie lists may enable a different number of items within the list content to be displayed, than, for example, an email application, music access application, video access application, or the like. Thus, in one embodiment, various list applications may employ different list splitting sizes.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, mobile devices (client devices) 102-104, content services 107-108, and customizer services 109.

One embodiment of mobile devices 102-104 is described in more detail below in conjunction with FIG. 2. Generally, however, mobile devices 102-104 may include virtually any portable computing device capable of receiving and sending information over a network, such as network 105, wireless network 110, or the like. Mobile devices 102-104 may also be described generally as client devices that are configured to be portable. Such portable devices include computing devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed. Moreover, mobile devices 102-104 may have limited memory page footprints. For example, one mobile device may be physically limited to 10 Kbytes of a memory page footprint (size constraint), while another mobile device may be physically limited to some other size of memory page footprint.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), Compact HTML (cHTML), EXtensible HTML (xHTML), or the like, to display and send a message.

Mobile devices 102-104 also may include at least one other client application that is configured to receive content from another computing device. The client application may include a capability to provide and receive textual content, graphical content, audio content, and the like. The client application operates as user-agent to further provide information that identifies the mobile device, including a type, capability, name, or the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format, and/or a capability of the mobile device. For example, in one embodiment, the client application (or user-agent) may be configured to provide information about a type of mobile device, an application available on the mobile device, a memory page footprint (or memory page size constraint) for the mobile device, or the like. In one embodiment, the client application may be implemented as an application, a script, applet, or the like.

Mobile devices 102-104 may also be configured to communicate a message, such as through Short Message Service (SMS), Multimedia Message Service (MMS), instant messaging (IM), internet relay chat (IRC), Jabber, and the like, between itself and another computing device. However, the present invention is not limited to these messaging protocols, and virtually any other messaging protocol may be employed.

Wireless network 110 is configured to couple mobile devices 102-104 with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to enable customizer services 109, and/or content services 107-108 to communicate with other computing devices, including, through wireless network 110 with mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between one computing device and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of content services 107-108 is described in more detail below in conjunction with FIG. 3. Briefly, however, content services 107-108 may be configured to operate as a website server to provide content, including list content, in response to a request, or the like. However, content services 107-108 are not limited to web servers, and may also operate as a messaging server, a File Transfer Protocol (FTP) server, a database server, an email server, music and/or video download server, or the like. Additionally, content services 107-108 may be configured to perform multiple functions. Thus, for example, content services 107-108 may be configured as a messaging server, and as a database server. Moreover, while content services 107-108 may operate as other than a website, content services 107-108 may still be enabled to receive a request for web content, documents, or the like.

In one embodiment, content services 107-108 may be configured to provide content for use by a mobile device, such as mobile devices 102-104. However, the content may be configured in a generic mobile device readable format. That is, in one embodiment, the content may be formatted to be relatively independent of a mobile device capability, carrier capability, or the like. For example, in one embodiment, the content may be formatted 'ignorant of' a mobile device's memory page size constraint, or the like. However, the content may be formatted for WAP capable computing devices. As such, in one embodiment, the content may reside on content services 107-108 in HDML, WML, WMLScript, JavaScript, XML, cHTML, xHTML, or the like.

In one embodiment, content services 107 may include a connector component that is configured to receive a request for list content from mobile devices 102-104. The connector component may include a classifier component that may then determine a page weight size for the mobile device based on a type of mobile device, or other information obtainable about the mobile device. Then a list tailoring application may be employed to partition (or split) the list content into one or more segmented lists. In one embodiment, the list tailoring application may partition the list content based on a particular application associated with the list content. In one embodiment, the list tailoring application may be included within the connector component. However, in another embodiment, the list tailoring application may be included, and/or called from other application. Moreover, a mail application may (although need not) employ a different list tailoring size limit, than say, for example, a movie application, or the like. In one embodiment, the segmented list content may be coupled together through links, or the like. In one embodiment, content services 107 connector component may employ a process such as described below in conjunction with FIG. 4 to perform at least some of its actions.

Although the connector component is described as operating within, content services 107, the invention is not so limited. For example, in one embodiment, the connector component may reside within another computing device, external to the content services. Thus, in one embodiment, customizer services 109 may include a connector component, such that content services 108 may employ customizer services 109 to classify a requesting mobile device and/or to list tailor list content. Thus, content services 107-108 and customizer services 109 illustrate various embodiments for implementing and using a connector component for managing list content Devices that may operate as content services 107-108 and customizer services 109 include personal computers, desktop computers, multiprocessor systems, microprocessor-based or programmable electronics, network PCs, servers, or other network devices.

Illustrative Mobile Client Environment

Figure 2:
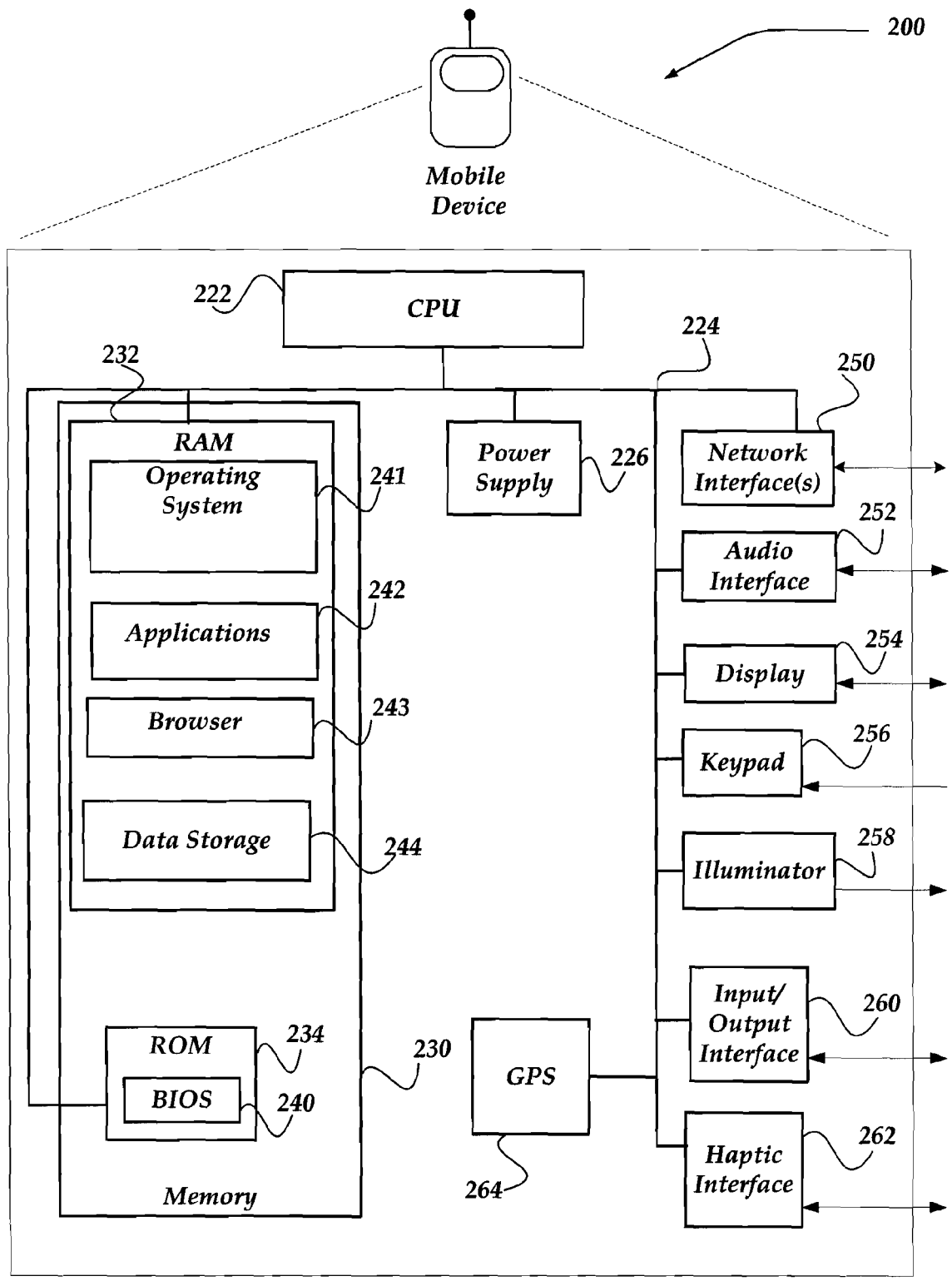
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200, including, for example, a memory page footprint. The information may then be provided to another device based on any of a variety of events, including being sent as part of a header during a communication, sent upon request, or the like. At least a portion of the information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. As shown, mobile device 200 includes browser 243 as one example of an application configured to display list content. Clearly, however, any of a variety of other applications may be configured to display list content, including, but not limited to email applications, calendar applications, game applications, video and/or audio access applications, or the like.

Illustrative Server Environment

Figure 3:
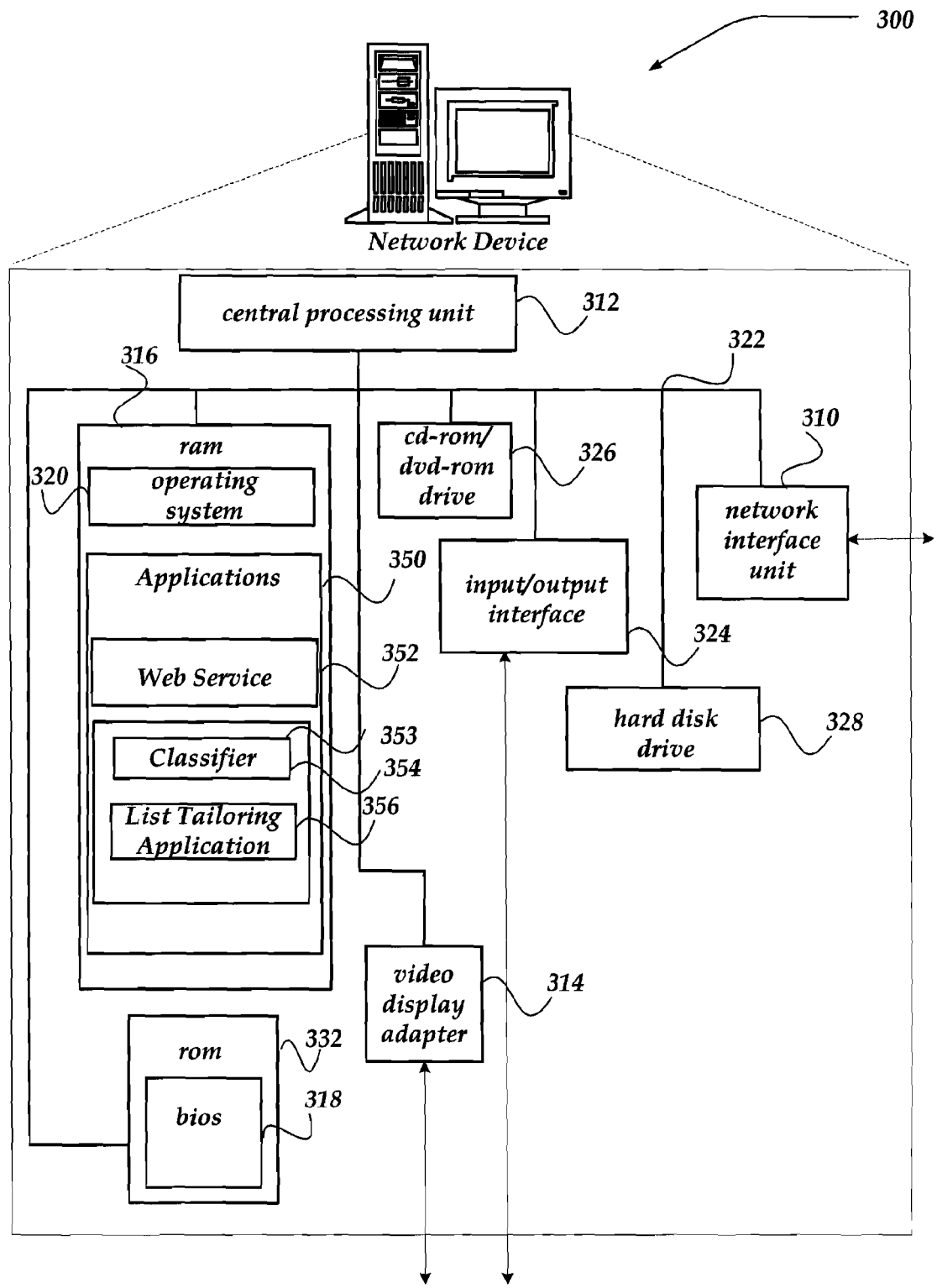
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, content services 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NTIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, encryption programs, security programs, VPN programs, SMS message servers, IM message servers, email servers, account management and so forth. The mass memory may further include web service 352, and connector component 358. In one embodiment, connector component 358 further includes estimator component 354 and page tailoring component 356.

Web service 352 represents any of a variety of services that are configured to provide list content over a network to another computing device. Thus, web service 352 may also represent, for example, a web server, messaging server, a File Transfer Protocol (FTP) server, a database server, a content server, music and/or video download service, or the like. Web service 352 may provide the content over the network using any of a variety of formats, including, but not limited to WAP, HDML, WML, SMGL, HTML, XML, cHTML, xHTML, or the like. In one embodiment, web service 352 may provide the content formatted to be generally independent of a destination device. Thus, for example, while the content may be formatted for use with a browser that may be capable of displaying content in at least one of the above formats, the content may be formatted independent of a device constraint such as memory page footprint, or the like. For example, in one embodiment, the content may be formatted absent a mobile device session identifier, or the like.

In one embodiment, applications 350 may also include connector component 353. In turn, connector component 353 may include classifier 354 and possibly list tailoring application 356. In one embodiment, classifier 354 may receive information about a requesting mobile device, including for example, a mobile device type, or the like. In one embodiment, a mobile device identifier may also be received. In one embodiment, classifier 354 may then employ the mobile device type, device identifier, or the like, to examine a data store such as might be stored within hard disk drive 328, cd-rom/dvd-rom drive 326, or the like. In one embodiment, classifier 354 may obtain from the data store additional information about the mobile device. In one embodiment, classifier 354 may also determine from the data store, and/or additional information, a page size weight classification for the mobile device. Classifier 354 may then provide the page size weight classification to list tailoring application 356 for use in tailoring list content from web services 352, or the like, destined for the requesting mobile device. If list tailoring application 356 determines that the list content exceeds the page size weight classification, list tailoring application 356 may then segment the list content based on a particular application's page tailoring limits. Connector component 353 may employ processes such as those described below in conjunction with FIG. 4 to perform at least some of its actions.

Although described above with connector component 353 within network device 300, the invention is not so limited. Thus, as illustrated in FIG. 1, connector component 353 may reside within another network device, such as customizer services 109 of FIG. 1, while web service 352 resides within content services 108 of FIG. 1.

Generalized Operation

Figure 4:
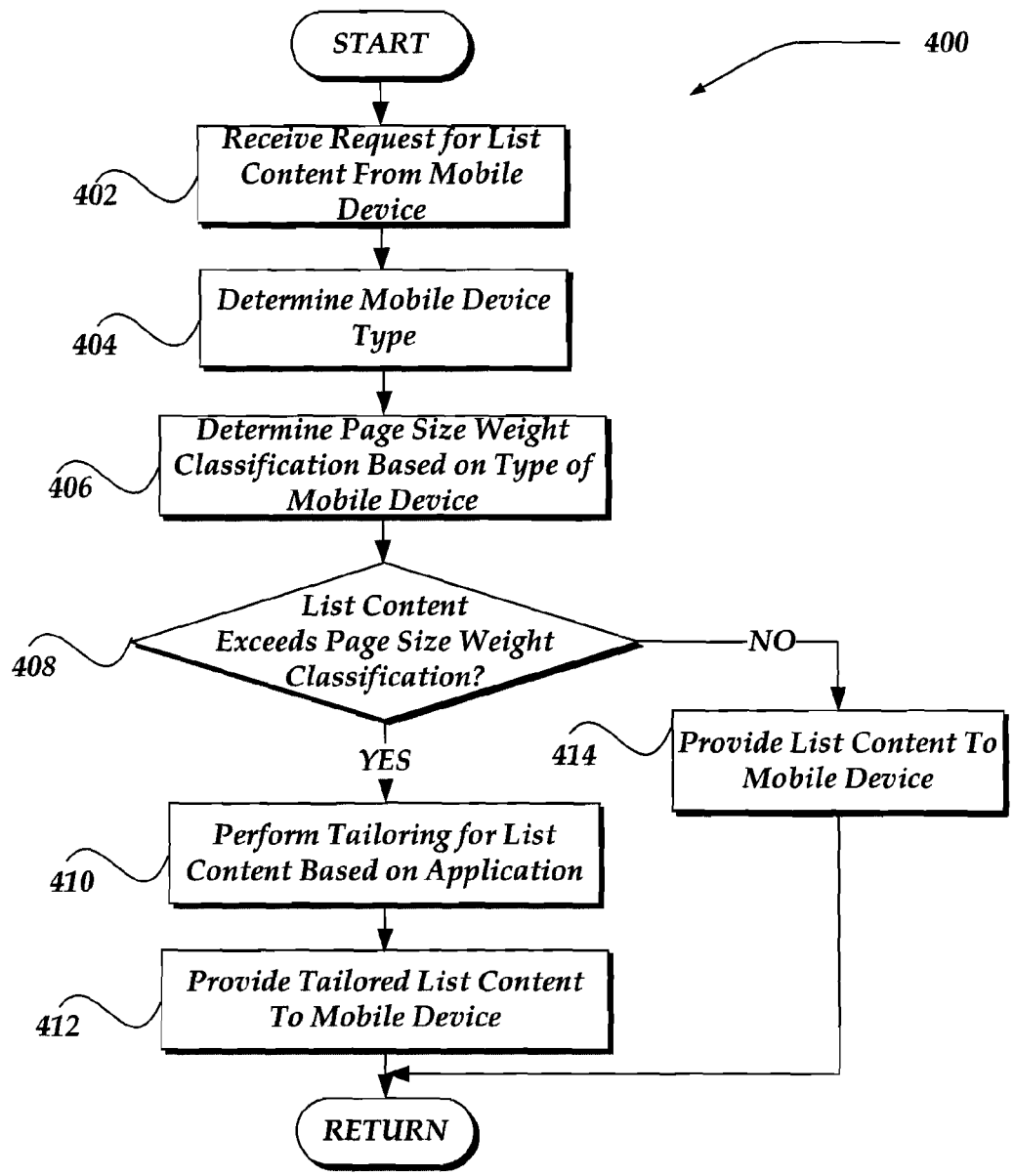
FIG. 4 illustrates a logical flow diagram generally showing one embodiment of an overview of a process for managing content size for a mobile device using process effects estimation.

The operation of certain aspects of the invention will now be described with respect to FIG. 4. FIG. 4 illustrates a logical flow diagram generally showing one embodiment of an overview of a process for managing content size for a mobile device using page size weight classifications and list tailoring services. Process 400 of FIG. 4 may be implemented within network device 300 of FIG. 3, in one embodiment.

Process 400 begins, after a start block, at block 402, where a request for list content is received from a mobile device. In one embodiment, the list content may include multiple sub-lists, such as might be employed by an email application, music application, or the like.

Processing flows next to block 404 where a determination is made as to a type of the requesting mobile device. As described above, in one embodiment, type information may be obtained through a communication with a user agent, or similar application, or component, residing on the mobile device. In one embodiment, the type information might describe a model number, a product serial number, or the like, associated with the mobile device. In one embodiment, a mobile device identifier may be obtained, which may then be employed to obtain type information about the mobile device. In one embodiment, a memory page size may be obtained through communications with the mobile device. In another embodiment, information from the mobile device may be employed to search a data store that may include a memory page size for the mobile device.

Processing continues next to block 406, where the mobile device type or memory page size constraint may be employed to determine a page size weight classification for the requesting mobile device. One example of a page size weight classification may include values of memory page sizes, such as:

For memory page sizes $\leq 5000$ bytes, then page size weight=small;
For memory page sizes<5000 bytes, but $\leq 10,000$ bytes, then page size weight=medium; and
For memory page sizes<10,000 bytes, then page size weight=large.

However, the invention is not limited to these values, or even the classifications of small, medium, and large. Virtually any classifications and/or number of divisions may be employed. For example, the classifications may include very small, small, medium, large, and extra large, without departing from the scope of the invention.

In any event, at block 406, the mobile device may be classified according to a selected classification approach. Processing then flows to decision block 408 where a determination may be performed to see if a size of list content exceeds a page size weight classification. If it is determined that the list content size does not exceed the page size weight classification, processing proceeds to block 414; otherwise, processing flows to block 410.

At block 414, the list content may be provided over a network to the mobile device. Processing then returns to a calling process to perform other actions.

At block 410, however, a list tailoring of the list content is performed based on a given application associated with the list content. Thus, for example, in one embodiment of a mail application, the following tailored item size limits may be employed:

For message headers:
For small page size weight=>list 5 items;
For medium page size weight=>list 10 items; and
For large page size weights=>list 15 items.
For mail actions (such as compose, check mail, check work, search mail, refresh, or the like):
For small page size weight=>list 1 item;
For medium page size weight=>list 2 items; and
For large page size weights=>list 2 items.
For folders (such as inbox, trash, bulk, vacation, spam, or the like):
For small page size weight=>list 3 items;
For medium page size weight=>list 5 items; and
For large page size weights=>list 7 items.

The above limits are intended as an example and are not intended to be limiting, or to otherwise narrow the scope of the invention. Thus, other values may be employed, without departing from the scope of the invention. Moreover, where an application includes less or more than three lists (or sub-lists) within the list content, the application may employ additional tailored page item limits. In addition, the application may even limit the number of sub-lists being displayed using a substantially similar approach. Thus, for example, in one embodiment, for a small page size weight, the application may select to display a title only for each of the three lists—message headers, mail actions, and folders, with a <next> link displayed for each of the three lists (sub-lists). As noted the invention is not constrained to merely three sub-lists, and virtually any displayable number of lists may be managed using the invention. For example, in one embodiment, a fourth sub-list useable, for displaying address book contacts may be included for the mail application, where, for example:

For Contacts:
For small page size weight=>list 5 items;
For medium page size weight=>list 10 items; and
For large page size weights=>list 15 items, may be employed.

Moreover, it should be clear that the invention is not limited to mail applications. For example, in one embodiment, movies, audio lists, or the like may also employ list tailoring. For example, for movies, in one embodiment, two sub-lists might be employed, where For top movies (audio files, video clips, or the like):
For small page size weight=>list 5 items;
For medium page size weight=>list 10 items; and
For large page size weights=>list 15 items, may be employed.

And, for access to the movies (audio files, video clips, or the like), links to the movies might employ the following:
For small page size weight=>list 5 items;
For medium page size weight=>list 3 items; and
For large page size weights=>list 1 items, may be employed.

In any event, at block 410, based on the application for displaying the list content, the list content may then be tailored. One example of how this may be performed is described in more detail below in conjunction with FIG. 5. For example, in one embodiment, a list (or sub-list) within the list content may be segmented into multiple segments, with each segment being coupled with a <next> and/or <previous> link. Processing then flows to block 412, where the tailored list content may be provided to the mobile device over a network. Processing then returns to a calling process to perform other actions.

It will be understood that each block of the flowchart illustration, and combinations of blocks in the flowchart illustration, can be implemented by computer program instructions. These program instructions may be provided to a processor to produce machine code, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Example of List Content Tailoring

Figure 5:
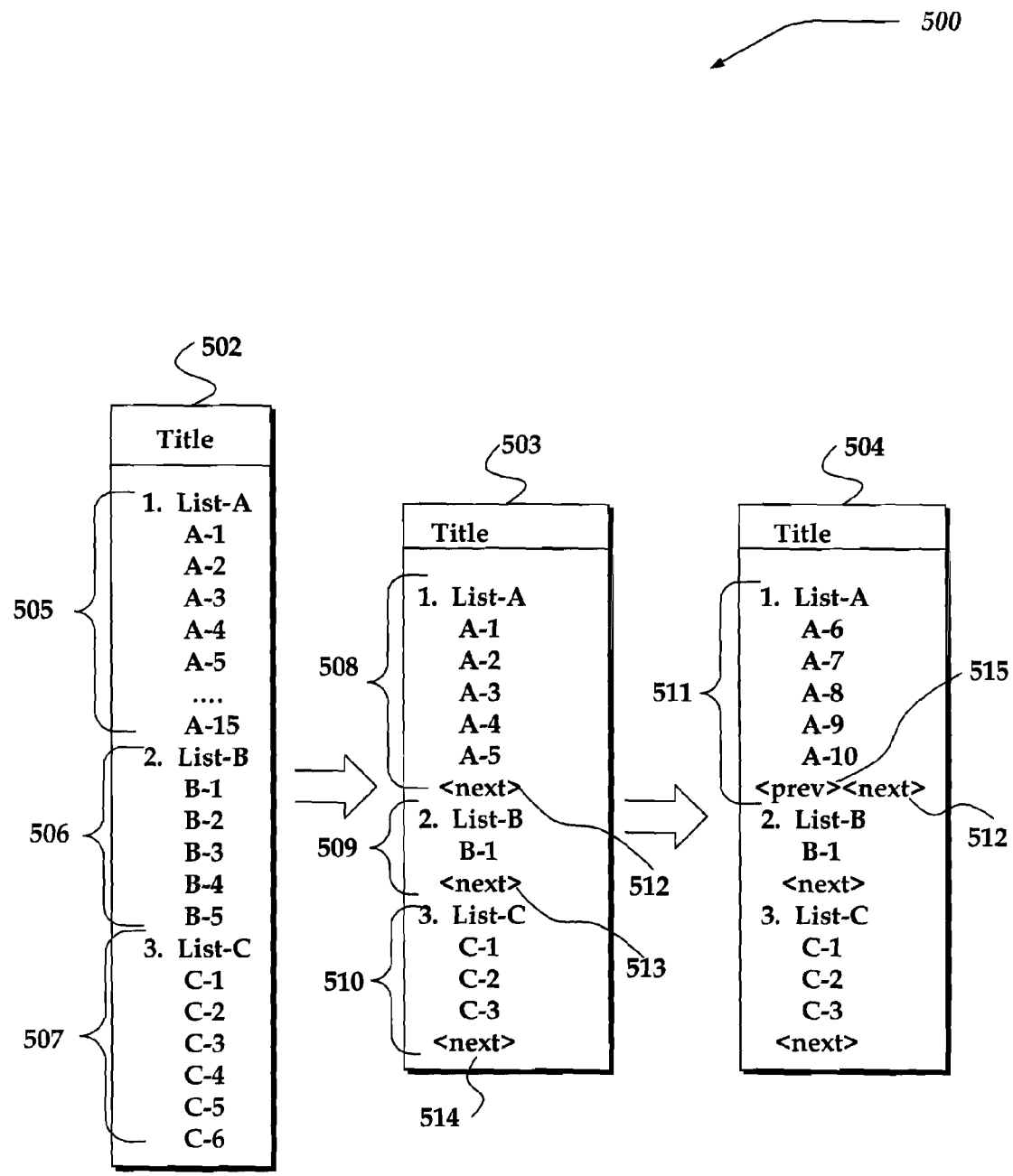
FIG. 5 illustrates one embodiment of an example of tailoring list content for a mobile device, in accordance with various embodiments.

One example of list tailoring for a mobile device will be described with respect to FIG. 5. While FIG. 5 illustrates one embodiment of an example of tailoring list content for a mobile device, the invention should not be construed as being limited by this example. It is intended merely to illustrate how tailoring of list content may be employed, and should not be considered as an exhaustive or limiting example.

As illustrated example 500 shows list content 502 that includes three lists (or sub-lists) within list content 502, sub-lists 505-507. For purposes of illustration, list content 502 may might represent email application where, for example, sub-list 505 might represent a list of email message headers (subject lines, or the like). Similarly, sub-list 506 might, for example, represent a list of actions that might be displayed. For example, sub-list 506 might include a compose action, a check mail action, a check work action, a search mail action, a refresh action, a delete mail action, or the like. Sub-list 507 might represent a list of folders associated with the mail application, such as an inbox, outbox, sent box, trash box, bulk box, vacation box, spam box, or the like. As such, multiple items might be included within multiple sub-lists within list content 502.

However, because of page size constraints for some mobile devices, the entire list content 502 might not be displayable within a single display screen. Thus, use of the present invention enable list tailoring to be employed based on a type of the mobile device and the application.

For example, it might be determined for this email application and mobile device, that sub-list 505 might be limited to display of 5 items, while sub-list 506 might be item size limited to display of 1 item, and sub-list 507 might limited to display of 3 items. Clearly, this is merely an example, and other number of items, or combination of items within the sub-lists might be selected.

For this example, however, list content 502 may be list tailored for display as list content 503. As shown in FIG. 5, list content 503 is configured such that sub-list 508 includes display of 5 items, with a <next> link 512. Similarly, sub-list 509 includes display of 1 item, while sub-list 510 includes display of 3 items, each sub-list including a <next> link (513-514).

By selecting the <next> link 512, the mobile device may display a next sub-list of items, as illustrated within list content 504. As shown, sub-list 511 now displays the next sub-list of items from sub-list 505 of list content 502. In addition, however, sub-list 511 may also include <previous> link 515 that enables a user to display the previous item list (sub-list 508 of list content 503).

It should be noted, that while the above example illustrates that each sub-list is segmented such that the list content with that sub-list maintains an original order, the invention is not so limited. For example, in one embodiment, at least some of the items with a given sub-list may be determined to have a higher display priority than another item with the given sub-list. Thus, for example, while sub-list 510 illustrates display of C-1 through C-3, it may be determined that item C-6 is of a higher display priority than say C-3. In that instance, in one embodiment, the initial display might display C-1 through C-2, and C-6. A subsequent segment of display 510 might then display C-3. Thus, none of the items with a segmented sub-list need be dropped.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A non-transitory storage device having processor-executable instructions for managing content for use on a mobile device over a network, the processor-executable instructions when installed onto a computing device enable the computing device to perform actions, comprising:
   receiving a request from the mobile device for list content;
   receiving information about the mobile device;
   employing the received mobile device information to determine a page size weight classification for the mobile device that is determined based on a memory page size for the mobile device;
   when the size of the list content exceeds the page size weight classification:
      determining an application and list type associated with displaying of the at least one list content,
      for the determined application and list type and the page size weight classification, determining a tailored size limit for the number of list items allowed to be displayed within a display on the mobile device, and
      using the tailored size limit and a list tailoring mechanism, segmenting the at least one list content into a plurality of sub-lists for display across a plurality of displays,
   providing the segmented list content to the mobile device over the network.

2. The non-transitory storage device of claim 1, wherein the processor-executable instructions perform actions, further comprising:
   if the size of the list content is less than or equal to the page size weight classification, providing the list content unsegmented to the mobile device.

3. The non-transitory storage device of claim 1, wherein each list within the list content is segmented based on the item size limit associated with each list for the associated application, where, if the application is a mail application, the item size limit being selected based further on the list type being selected from one of a folder type, a mail action type, or a message header.

4. The non-transitory storage device of claim 1, wherein the page size weight classification further comprises classifying the mobile device based on a range of memory page sizes for the mobile device, where for at least a first range setting the page size weight classification to 'small,' for a second range setting the page size weight classification to 'medium,' and for at least a third range setting the page size weight classification to 'large.'

5. The non-transitory storage device of claim 1, wherein the page size weight classification further comprises at least one of a small, medium, and large page size weight classification based on the memory page size for the mobile device.

6. A system useable in managing content for use on a mobile device, comprising:
   one or more network devices having memory and a central processing unit for executing one or more applications, including:
      a classifier that is configured to perform actions, including:
         receiving information about the mobile device including a memory page size, wherein the information is useable to determine at least a mobile device type;
         employing the mobile device type and memory page size to determine a page size weight classification for the mobile device; and
      a page tailoring application that is associated with an application that is configured to display list content, wherein the page tailoring application is configured to perform actions, including:
         determining a size of a list content requested by the mobile device;
         when the size of the list content exceeds the page size weight classification for the mobile device:
            determining an application and list type associated with displaying of the at least one list content,
            for the determined application and list type and the page size weight classification, determining a tailored size limit for the number of list items allowed to be displayed within a display on the mobile device, and
            using the tailored size limit and a list tailoring mechanism, segmenting the at least one list content into a plurality of sub-lists across a plurality of displays, and
            providing the segmented list content to the mobile device such that each segment is displayable on the mobile device absent lose of an item within the list content.

7. The system of claim 6, wherein one segment within a segmented list is coupled to another segment of the segmented list using at least one of a <next> or <previous> link.

8. The system of claim 6, wherein at least one item within a segmented list of the list content is reordered based, in part, on a display priority.

9. The system of claim 6, wherein the page size weight classification is based on a range of possibly displayable content on a display of the mobile device.

10. The system of claim 6, wherein the list type is identified for a mail application as being one of a message header type, a mail action type, or a mail folder type.

11. A method of managing a mobile communication over a network, comprising:
   receiving information about the mobile device;
   employing the mobile device information to determine a page size weight classification for the mobile device based on a memory page size for the mobile device;
   determining a size of a list content requested by the mobile device; and
   when the size of the list content exceeds the page size weight classification for the mobile device:
      determining an application and list type associated with displaying of the at least one list content,
      for the determined application and list type and the page size weight classification, determining a tailored size limit for the number of list items allowed to be displayed within a display on the mobile device, and
      using the tailored size limit and a list tailoring mechanism, segmenting the at least one list content into a plurality of sub-lists across a plurality of displays, and providing the segmented list content for display on the mobile device.

12. The method of claim 11, wherein one segment within a segmented list is coupled to another segment of the segmented list using a link.

13. The method of claim 11, wherein the mobile device information comprises at least one of a mobile device type or a mobile device identifier.

14. A computer-readable storage device configured to include program instructions for performing the method of claim 11.

15. An apparatus that is operative to prepare content for use on a mobile device over a network, comprising:
   memory for storing data and instructions; and
   a central processing unit for executing instructions that enables actions, including:
      receiving a request from the mobile device for content, wherein the content includes at least one list;
      receiving information about the mobile device;
      employing the received mobile device information to determine a page size weight classification for the mobile device based on a memory page size for the mobile device;
      comparing the page size weight classification to a size of the at least one list content;
      when the size of the at least one list content exceeds the page size weight classification:
         determining an application and list type associated with displaying of the at least one list content,
         for the determined application and list type and the page size weight classification, determining a tailored size limit for the number of list items allowed to be displayed within a display on the mobile device, and
         using the tailored size limit and a list tailoring mechanism, segmenting the at least one list content into a plurality of sub-lists across a plurality of displays to generate a tailored list content, and
      providing the content, including the tailored list content to the mobile device over the network.

16. The apparatus of claim 15, wherein employing the list tailoring mechanism further comprises:
   segmenting the each of the at least one lists using the item size limit, wherein each segment for a given list is coupled using a link.

17. The apparatus of claim 15, wherein the at least one list is segmented based on the item size limit for the associated application and list type;
   where, for a mail application, the item size limit is determined for a given list type that consists of one of a mail action, a mail folder type, or a message header.

18. The apparatus of claim 15, wherein page tailoring further comprises reordering at least one item with the at least one segmented list.

19. The apparatus of claim 15, wherein providing the content to the mobile device further comprise providing a first segment of the tailored list content to the mobile device, and receiving a request from the mobile device to provide another segment of the tailored list content.

20. The apparatus of claim 15, wherein determining the page size weight classification for the mobile device further comprises classifying the mobile device according to a size range of bytes within the memory page size for the mobile device based the received mobile device information.

* * * * *